(12) United States Patent
Shin et al.

(10) Patent No.: US 9,786,252 B2
(45) Date of Patent: Oct. 10, 2017

(54) METHOD AND APPARATUS FOR SUPPRESSING BACKGROUND LIGHT IN TIME OF FLIGHT SENSOR

(71) Applicants: Samsung Electronics Co., Ltd., Suwon-si (KR); The Regents of the University of Michigan, Ann Arbor, MI (US)

(72) Inventors: Jung Soon Shin, Yongin-si (KR); Seong Jin Kim, Seoul (KR); Euisik Yoon, Ann Arbor, MI (US); Jihyun Cho, Ann Arbor, MI (US)

(73) Assignees: Samsung Electronics Co., Ltd., Gyeonggi-do (KR); The Regents of the University of Michigan, Ann Arbor, MI (US)

( * ) Notice: Subject to any disclaimer, the term of this patent is extended or adjusted under 35 U.S.C. 154(b) by 958 days.

(21) Appl. No.: 13/964,512

(22) Filed: Aug. 12, 2013

(65) Prior Publication Data

US 2014/0071180 A1 Mar. 13, 2014

Related U.S. Application Data

(60) Provisional application No. 61/698,913, filed on Sep. 10, 2012.

(30) Foreign Application Priority Data

Feb. 5, 2013 (KR) ........................ 10-2013-0012933

(51) Int. Cl.
*G09G 5/10* (2006.01)
*G01S 17/89* (2006.01)
*G01S 7/497* (2006.01)

(52) U.S. Cl.
CPC ................ *G09G 5/10* (2013.01); *G01S 7/497* (2013.01); *G01S 17/89* (2013.01)

(58) Field of Classification Search
CPC ............ G01S 17/89; G01S 7/497; G09G 5/10
See application file for complete search history.

(56) References Cited

U.S. PATENT DOCUMENTS

| 4,618,235 A | * | 10/1986 | Ishida | ................ G02B 7/34 396/96 |
| 5,270,780 A | * | 12/1993 | Moran | .................... G01S 17/89 313/373 |
| 5,528,642 A | * | 6/1996 | Hirama | ................ H04N 5/3577 257/234 |
| 2006/0108506 A1 | * | 5/2006 | Yang | .................... H04N 3/1562 250/208.1 |

(Continued)

FOREIGN PATENT DOCUMENTS

| JP | 2007-232687 | 9/2007 |
| JP | 2008-89346 | 4/2008 |

(Continued)

*Primary Examiner* — Peter D Le
(74) *Attorney, Agent, or Firm* — Harness, Dickey & Pierce P.L.C.

(57) ABSTRACT

A background light suppression apparatus and method capable of suppressing influences of background light in a depth sensor includes measuring output signals of sub pixels for a sub integration time shorter than a frame integration time; and integrating differences between the output signals after the sub integration time.

21 Claims, 16 Drawing Sheets

(56) References Cited

U.S. PATENT DOCUMENTS

| | | | | |
|---|---|---|---|---|
| 2007/0075883 | A1* | 4/2007 | Storm | H04N 5/3598 |
| | | | | 341/120 |
| 2007/0257184 | A1* | 11/2007 | Olsen | G02B 3/0062 |
| | | | | 250/208.1 |
| 2009/0030630 | A1* | 1/2009 | Eitan | G01N 21/9501 |
| | | | | 702/81 |
| 2011/0116078 | A1* | 5/2011 | Cho | H01L 27/14625 |
| | | | | 356/51 |
| 2012/0092485 | A1* | 4/2012 | Meinherz | F16P 3/142 |
| | | | | 348/91 |
| 2012/0099006 | A1* | 4/2012 | Matsuo | H04N 5/23212 |
| | | | | 348/241 |
| 2012/0242975 | A1* | 9/2012 | Min | G01S 17/89 |
| | | | | 356/5.03 |
| 2013/0002823 | A1* | 1/2013 | Lim | G01S 17/89 |
| | | | | 348/46 |

FOREIGN PATENT DOCUMENTS

| | | |
|---|---|---|
| KR | 10-2011-0009691 | 1/2011 |
| KR | 10-2011-0044862 | 5/2011 |

* cited by examiner

FIG. 9

| Shift up-left | Shift up | Shift up-right |
| Shift left | Original position | Shift right |
| Shift down-left | Shift down | Shift down-right |

METHOD AND APPARATUS FOR SUPPRESSING BACKGROUND LIGHT IN TIME OF FLIGHT SENSOR

CROSS-REFERENCE TO RELATED APPLICATIONS

This application claims the priority benefit under 35 U.S.C. §119(e) of a U.S. Provisional Application No. 61/698,913 filed on Sep. 10, 2012, in the U.S. Patent and Trade Mark Office, and the benefit under 35 U.S.C. §119(a) of Korean Patent Application No. 10-2013-0012933, filed on Feb. 5, 2013, in the Korean Intellectual Property Office, the entire disclosures of which are incorporated herein by reference.

BACKGROUND

1. Field

One or more example embodiments of the following description relate to a method of suppressing influences of background light projected to a time of flight (TOF) sensor, and more particularly, to a background light suppression method in a TOF sensor that provides a reconfigurable architecture.

2. Description of the Related Art

A time of flight (TOF) sensor emits light towards an object and calculates a distance to the object using reflected light. In detail, the TOF sensor may calculate the distance to the object using a time taken for emitted light to return and using the velocity of light. By directly emitting light, the TOF sensor may measure a depth value in every pixel and obtain a depth image in real time.

SUMMARY

The foregoing and/or other aspects are achieved by providing a background light suppression method including measuring output signals of sub pixels for a sub integration time which is relatively shorter than a frame integration time; and integrating differences between the output signals after the sub integration time.

The foregoing and/or other aspects are also achieved by providing a background light suppression method including generating a super pixel by performing pixel binning with respect to a plurality of sub pixels; and integrating differences between output signals output from the super pixel based on a sub integration time which is relatively shorter than a frame integration time.

The background light suppression method may further include shifting the super pixel by altering combination of the sub pixels constituting the super pixel; and integrating differences between output signals output from the shifted super pixel.

The foregoing and/or other aspects are also achieved by providing a background light suppression apparatus including an output signal measurement unit to measure output signals of sub pixels for a sub integration time which is shorter than a frame integration time; and a signal difference integration unit to integrate differences between the output signals after the sub integration time.

The foregoing and/or other aspects are also achieved by providing a background light suppression apparatus including a super pixel generation unit to generate a super pixel by performing pixel binning with respect to a plurality of sub pixels; and a signal difference integration unit to integrate differences between output signals output from the super pixel based on a sub integration time which is relatively shorter than a frame integration time.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 9 illustrates an operation of shifting a super pixel according to example embodiments;

DETAILED DESCRIPTION

Figure 1:
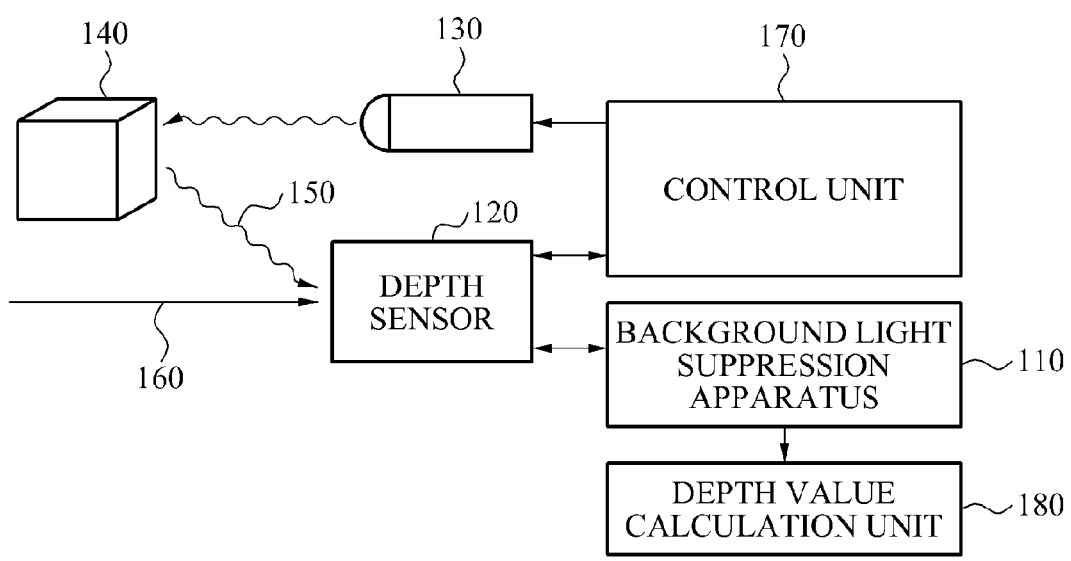
FIG. 1 illustrates an overall configuration of a system for calculating a depth value, according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates an overall configuration of a system for calculating a depth value, according to example embodiments.

The system may include a background light suppression apparatus 110, and may further include a depth sensor 120, a light source 130, a control unit 170, and a depth value calculation unit 180.

The control unit 170 may control operation of the depth sensor 120 and the light source 130 by a control signal. The light source 130 may emit light in the form of an infrared ray, a chopping wave, or a sine wave, for example, towards an object 140, based on the control signal received from the control unit 170. A reflective light 150 generated as the emitted light is reflected from the object 140 may be input to the depth sensor 120. The depth sensor 120 may convert the light into charge and integrate (or accumulate) the charge. For example, the depth sensor 120 may be a time of flight (TOF) sensor.

The depth sensor 120 may include a plurality of sub pixels. In the following description, for a convenient explanation, it is assumed that each sub pixel includes one photodiode and two floating diffusion (FD) nodes, that is, a first FD node and a second FD node. However, the sub pixel may include a plurality of photodiodes, or include a charge coupled device (CCD) or photogate instead of the photodiodes. A scope of the present disclosure is not to be limited by a configuration of the sub pixel. That is, various alterations and modifications may be applied.

When the reflective light 150 is input to the depth sensor 120, background light 160 may also be input to the depth sensor 120. The background light 160 may be transferred to the depth sensor 120, thereby generating charge unrelated to the reflective light 150. Consequently, an incorrect calculation of a depth value may be caused.

The background light suppression apparatus 110 may suppress influences of the background light 160 affecting the depth sensor 120, to prevent a distortion or error of the depth value from occurring due to the background light 160.

For example, the background light suppression apparatus 110 may measure voltages of the first FD node and the second FD node using gate signals having different phases, and remove an error in the depth value caused by the background light 160 using a voltage difference between the FD nodes. To be more specific, one time, the background light suppression apparatus 110 may measure voltages of the first FD node and the second FD node using gate signals having phase differences of approximately 0 degrees and approximately 180 degrees, respectively, with respect to the light emitted from the light source 130. Another time, the background light suppression apparatus 110 may measure voltages of the first FD node and the second FD node using gate signals having phase differences of approximately 90 degrees and approximately 270 degrees, respectively, with respect to the light emitted from the light source 130. The background light suppression apparatus 110 may suppress the influences of the background light 160 causing the error in the depth value, based on a voltage difference between the first FD node and the second FD node.

However, if the background light 160 is strong, the sub pixel may be saturated due to a limited well capacity of the sub pixel. In this case, the sub pixel may output a fixed output value without generating additional charge, even when the reflective light 150 is input. Therefore, when the sub pixel is saturated, the depth value may not be normally calculated.

To prevent saturation of the sub pixel, the background light suppression apparatus 110 may control a time period for sampling the reflective light 150. For example, when the sub pixel 160 is saturated, the background light suppression apparatus 110 may reduce the time period for sampling, thereby reducing an amount of the background light 160 input during the sampling period. Presuming that intensity of the background light 160 input to the sub pixel is constant with respect to time, when the sampling period becomes approximately half, the quantity of the background light 160 input to the sub pixel may be reduced to approximately half.

In addition, the background light suppression apparatus 110 may provide a reconfigurable architecture based on a background-to-signal ratio (BSR), a signal-to-noise ratio (SNR), a frame rate of the depth image, and spatial resolution of the depth image. For example, the BSR may refer to a ratio between a current generated by a background light and a current generated as an output signal. The SNR may refer to a ratio between power of an output signal and power of a noise.

For example, the background light suppression apparatus 110 may perform pixel binning in a row direction to improve the BSR and the SNR, and perform pixel binning in a column direction to improve the SNR and complexity. Furthermore, the background light suppression apparatus 110 may increase the spatial resolution of the depth image by shifting a super pixel generated through pixel binning. For example, the pixel binning may refer to setting a plurality of sub pixels as a block and considering charge generated from the sub pixels in the block as charge generated from one pixel. When the pixel binning is performed, adjacent pixels may be interconnected by switches or the like. Through the pixel binning, the well capacity of the sub pixels may be increased and a number of effective rows may be reduced. The SNR may be improved by the increase in the well capacity. The BSR may be improved by the reduction in the number of the effective rows. The super pixel may denote a block of sub pixels generated by the pixel binning.

However, in the following description, the row direction and the column will not be interpreted to be absolute, but may be changed. Also, a scope of the embodiments will not be limited by definition of the column direction and the row direction.

The depth value calculation unit 180 may calculate the depth value from a reference position to the object 140, based on pixel signals from which the influences of the background light 160 are removed. For example, the reference position may be a position of a camera including the depth sensor 120. The depth value calculation unit 180 may calculate the depth value for every sub pixel included in the depth sensor 120, thereby generating one depth image frame.

Figure 2:
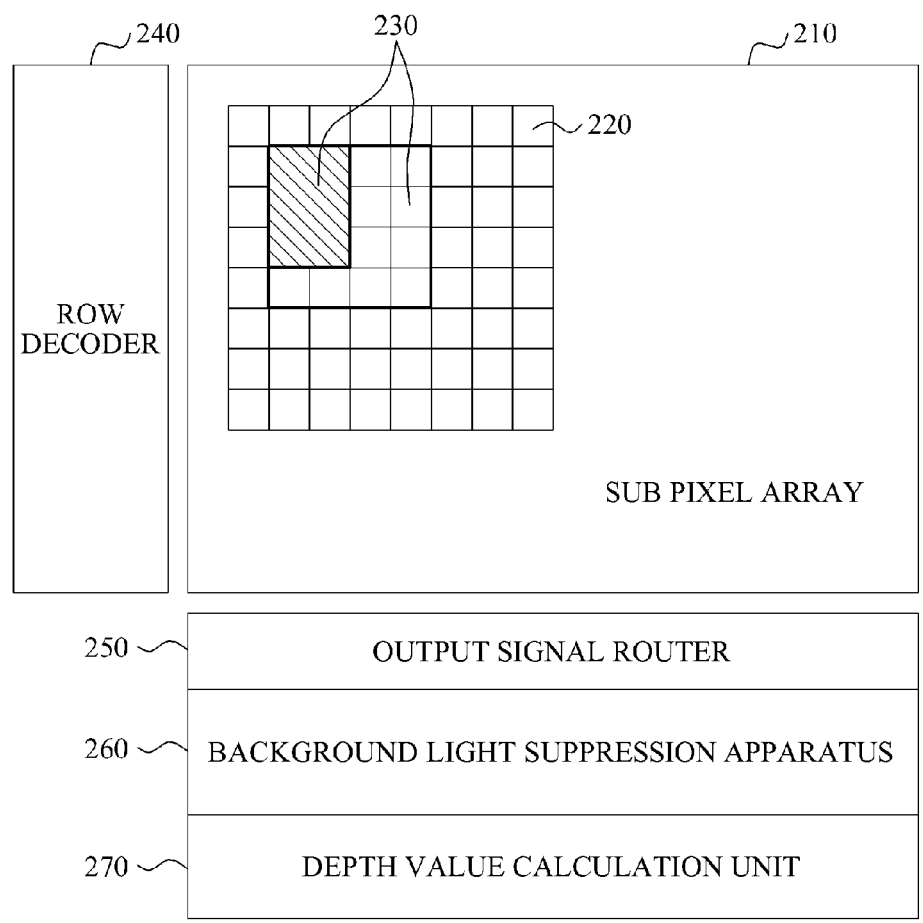
FIG. 2 illustrates a background light suppression apparatus present in a column level, according to example embodiments.

FIG. 2 illustrates a background light suppression apparatus present in a column level, according to example embodiments.

A sub pixel array 210 may include a plurality of sub pixels 220. A row decoder 240 may be located in a row direction of the sub pixel array 210. The row decoder 240 may control driving signals for driving the sub pixels 220 located in respective rows of the sub pixel array 210.

An output signal router 250, a background light suppression apparatus 260, and a depth value calculation unit 270 may be located in a column direction of the sub pixel array 210. The output signal router 250 may transmit output signals output from the sub pixels 220 to the background light suppression apparatus 260 or the depth value calculation unit 270. The depth value calculation unit 270 may calculate depth values of the sub pixels 220 based on the output signals of the sub pixels 220, in which the background light is suppressed. The depth value calculation unit 270 may include an analog-to-digital converter (ADC) (not shown) adapted to convert the output signals of the sub pixels 220, which are analog signals, into digital signals.

The background light suppression apparatus 260 may control the sub pixels 220 not to be saturated, by suppressing a background light input to the sub pixels 220. Additionally, the background light suppression apparatus 260 may generate a super pixel 230 by performing pixel binning with respect to the sub pixels 220. The super pixel 230 does not have to be in a square shape but may have any shape. By generation of the super pixel 230, an effective width and an effective height of the sub pixels 220 may become a positive number multiplied by a pitch of one sub pixel 220. The background light suppression apparatus 260 may be connected with an analog frame memory (not shown) for storing the output signals output from the sub pixels 220. The background light suppression apparatus 260 located in the column level may perform a background light suppression method in the row direction.

Presuming that the background light suppression apparatus 260 includes a plurality of background light suppression circuits, a number of the background light suppression circuits may be increased to increase the BSR. In detail, the background light suppression apparatus 260 may increase the number of the background light suppression circuits to process the sub pixels 220 located in a plurality of rows simultaneously.

For example, when a number of sub pixels 212 located in the column direction of the sub pixel array 210 is "X" and a number of background light suppression circuits in the column level is "2X", the background light suppression apparatus 260 may process sub pixels located in two rows at one time. That is, the BSR is doubled compared to when the number of the background light suppression circuits is "X." When the number of the background light suppression circuits is equal to the number of the sub pixels 220 included in the sub pixel array 210, the background light suppression apparatus 260 may process the sub pixels 220 in a pixel level other than the column level, accordingly maximizing the BSR.

Figure 3:
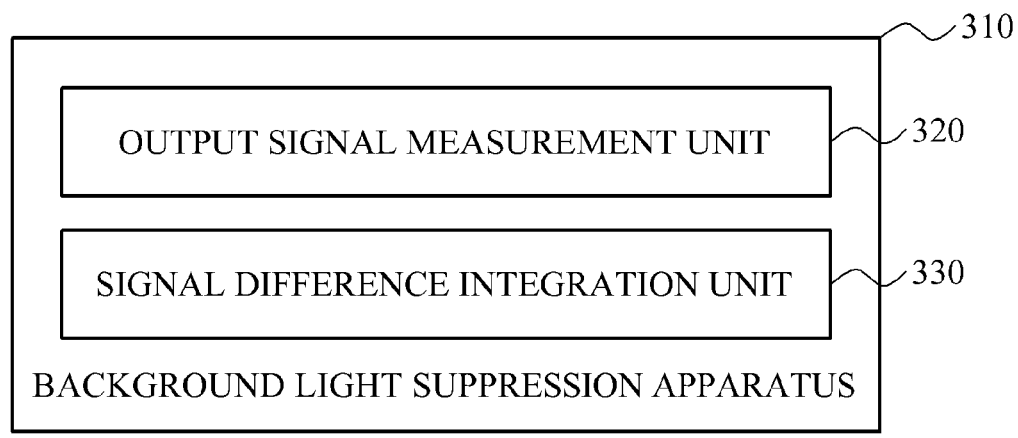
FIG. 3 illustrates a detailed configuration of a background light suppression apparatus, according to example embodiments.

FIG. 3 illustrates a detailed configuration of a background light suppression apparatus 310 according to example embodiments.

Referring to FIG. 3, the background light suppression apparatus 310 may include an output signal measurement unit 320 and a signal difference integration unit 330.

The output signal measurement unit 320 may measure output signals of sub pixels for a sub integration time which is relatively shorter than a frame integration time.

The frame integration time refers to a total time required for measurement of the output signals in the sub pixels to generate one depth image frame. For example, presuming that the background light suppression apparatus 310 generates a depth image frame through one sampling process in the sub pixels, a time required for performing the sampling once is the frame integration time. For example, when the background light suppression apparatus 310 generates the depth image frame through "N" times of sampling, the frame integration time may be a product of the time required for the one sampling process and "N" which is the number of times of the sampling.

The sub integration time may refer to a relatively shorter time than the frame integration time. The output signal measurement unit 320 may measure the output signals of the sub pixels for a duration of a plurality of the sub integration times. As aforementioned, because the sub pixels may include a first FD node and a second FD node, an output signal transferred from the first FD node and an output signal transferred from the second FD node may be included.

The sub integration time may be controlled based on at least one of a saturation degree of the sub pixels with respect to optical sensing and an intensity of the output signals. For example, when the intensity of the output signals of the sub pixels reaches a predetermined threshold or when the intensity of the output signals does not change for a predetermined time, the output signal measurement unit 320 may determine the sub pixels to be saturated. Alternatively, the output signal measurement unit 320 may determine the saturation degree of the sub pixels by determining an integrated quantity of charge with reference to the well capacity of the sub pixels. When the sub pixels are saturated, the output signal measurement unit 320 may reduce the sub integration time, thereby reducing intensity of light input to the sub pixels during the sub integration time. For example, when the sub integration time is reduced to approximately half, the sub pixels may receive less background light and the BSR may be increased. Furthermore, when intensity of light input during the sub integration time is determined to be insufficient, the output signal measurement unit 320 may increase the sub integration time.

The output signal measurement unit 320 may measure the output signals of the sub pixels based on gate signals having different phases. For example, the output signal measurement unit 320 may apply gate signals having a phase pair of approximately 0 degrees and approximately 180 degrees or of approximately 90 degrees and approximately 270 degrees to the sub pixels, thereby measuring the output signals.

After integration of the differences between the output signals of the sub pixels constituting the depth sensor, the output signal measurement unit 320 may measure the output signals of the sub pixels based on the gate signals of which phases are switched.

For example, the output signal measurement unit 320 may apply the gate signals having the phase pair of approximately 0 degrees and approximately 180 degrees to the sub pixels during a first sub integration time, and apply the gate signals having the phase pair of approximately 180 degrees and approximately 0 degrees to the sub pixels during a second integration time. After the second sub integration time, the output signal measurement unit 320 may apply the gate signals having the phase pair of approximately 0 degrees and approximately 180 degrees again to the sub pixels. Thus, the output signal measurement unit 320 may alternately switch paths of signals applied to the sub pixels. Through the alternate switching of signal paths, a gain mismatch generated between the signal paths may be removed.

The signal difference integration unit 330 may integrate the differences between the output signals output from the sub pixels after the sub integration time. For example, the signal difference integration unit 330 may integrate the differences by calculating a voltage difference between a first FD node and a second FD node after the sub integration time. The signal difference integration unit 330 may remove a common mode signal by integrating the differences between the output signals.

The signal difference integration unit 330 may integrate the differences between the output signals output from the sub pixels based on a reset signal applied to FD nodes of the sub pixels. For example, the signal difference integration unit 330 may use a difference between the output signals output from the respective FD nodes and the reset signal applied to the FD nodes. The signal difference integration unit 330 may remove a reset noise by performing correlated double sampling (CDS).

The signal difference integration unit 330 may continue integration of the differences between the output signals until the integrated value reaches a predetermined value. This may be achieved by repeating a process of measuring the output signals of the sub pixels for the sub integration time and integrating the differences between the output signals after the sub integration time.

Figure 4:
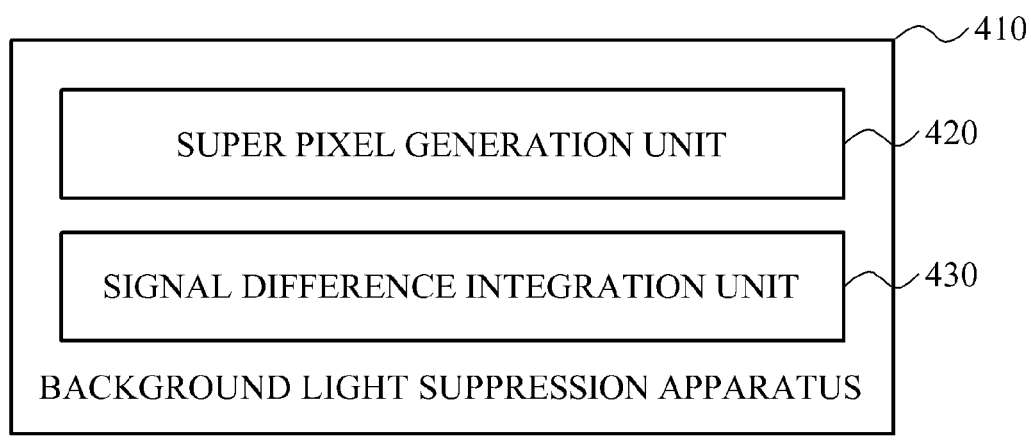
FIG. 4 illustrates a detailed configuration of a background light suppression apparatus, according to example embodiments.

FIG. 4 illustrates a detailed configuration of a background light suppression apparatus 410 according to example embodiments.

Referring to FIG. 4, the background light suppression apparatus 410 may include a super pixel generation unit 420 and a signal difference integration unit 430.

The super pixel generation unit 420 may generate a super pixel by performing pixel binning with respect to a plurality of sub pixels. For example, the super pixel generation unit 420 may set a block to adjacent sub pixels, sum outputs of a first FD node of the sub pixels defined in the block, and sum outputs of a second FD node, thereby generating one super pixel.

The super pixel generation unit 420 may perform pixel binning in a row direction based on intensity of output signals output from sub pixels. As a sub integration time increases, the BSR may be degraded. The super pixel generation unit 420 may perform pixel binning in the row direction to compensate for the degraded BSR. Also, the row direction pixel binning may improve the SNR.

For example, when the super pixel generation unit 420 performs pixel binning with respect to an "My" number of sub pixels located in the row direction, the BSR may be increased by a rate of "My" and a well capacity for integration of charge may be increased. Furthermore, presuming that a photon-shot noise is dominant in the integrated signals, the row direction pixel binning may improve the SNR by a rate of $\sqrt{M_y}$.

The super pixel generation unit 420 may perform pixel binning in a column direction based on complexity related to processing of the output signals output from the sub pixels. The column direction pixel binning may improve the SNR while reducing the complexity related to processing of the output signals.

For example, presuming that a background light suppression circuit included in the background light suppression apparatus 410 controls sub pixels included in one column, a number of the background light suppression circuits may need to be increased according to an increase in a number of the columns. Accordingly, the complexity and calculation amount for background light suppression processing may be increased. The column direction pixel binning may reduce the complexity and the calculation amount by reducing the number of necessary background light suppression circuits. In addition, the column direction pixel binning may reduce a chip area required for design.

When the complexity is determined to be high, the super pixel generation unit 420 may reduce the complexity by performing the column direction pixel binning. For example, the super pixel generation unit 420 may determine the complexity by comparing times necessary for signal processing, and perform the column direction pixel binning when the complexity is a predetermined threshold or higher.

The signal difference integration unit 430 may integrate differences between output signals output from the super pixel, based on a sub integration time which is relatively shorter than a frame integration time. For example, the signal difference integration unit 430 may integrate the differences by calculating a voltage difference between a first FD node and a second FD node of the super pixel after the sub integration time. The sub integration time may be controlled based on a saturation degree of the sub pixels with respect to optical sensing and intensity of the output signals.

In addition, the signal difference integration unit 430 may integrate the differences between the output signals output from the super pixel, based on a reset signal applied to the FD nodes of the super pixel. For example, the signal difference integration unit 430 may use a difference between output signals output from the respective FD nodes and the reset signal applied to the FD nodes. The signal difference integration unit 430 may continue integration of the differences between the output signals until the integrated value reaches a reference value for generating a depth image frame.

The super pixel generation unit 420 may shift the super pixel by changing a combination of the sub pixels constituting the super pixel. For example, the super pixel generation unit 420 may generate a new super pixel using sub pixels adjacent to an existing super pixel, which may be indicated as a shift of the super pixel.

When the pixel binning is performed, spatial resolution may be decreased. The super pixel generation unit 420 may shift the super pixel in various directions to compensate for the decreased spatial resolution. The signal difference integration unit 430 may increase the spatial resolution by integrating the differences between the output signals with respect to the respective shifted super pixels. In addition, the SNR may be increased by performing capturing several times.

The super pixel generation unit 420 may shift the super pixel based on the spatial resolution with respect to one depth image frame. When the spatial resolution is determined to be low, the super pixel generation unit 420 may integrate the differences between the output signals of the shifted super pixels, by shifting the super pixel. Accordingly, the sub pixels may each output independent pixel signals. Also, the spatial resolution decreased by pixel binning may be compensated.

Figure 5:
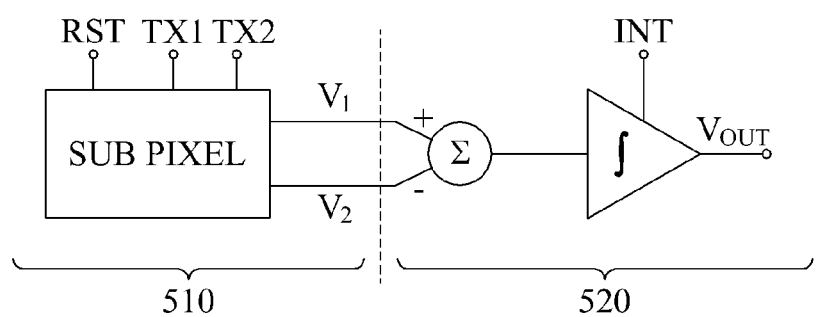
FIG. 5 illustrates a block diagram for describing an operation of a sub pixel and a background light suppression apparatus, according to example embodiments.

FIG. 5 illustrates a block diagram for describing operation of a sub pixel 510 and a background light suppression apparatus 520 according to example embodiments.

The sub pixel 510 may include two FD nodes. The two FD nodes may output signals in the form of voltages $V_1$ and $V_2$, respectively. Gate signals TX1 and TX2 having different phases may be applied to the sub pixel 510. A reset signal RST may be applied to reset the sub pixel 510. The gate signals may have a phase pair of approximately 0 degrees and approximately 180 degrees or of approximately 90 degrees and approximately 270 degrees to the sub pixels, thereby measuring the output signals. The background light suppression apparatus 520 may control a reset signal RST of the sub pixel 510.

The background light suppression apparatus 520 may be in the form of a difference integrator and integrate differences between output signals output from the sub pixel 510. The background light suppression apparatus 520 may trigger integration operation by a control signal INT. For example, when the control signal INT is applied to the background light suppression apparatus 520, the background light suppression apparatus 520 may integrate the voltage differences between the output voltages $V_1$ and $V_2$ of the sub pixel 510 at a control signal INT application time.

Figure 6A:
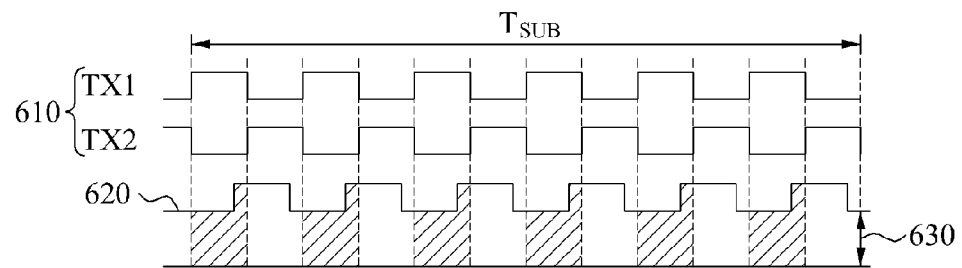
FIGS. 6A and 6B illustrate timing diagrams describing an operation of a sub pixel and a background light suppression apparatus, according to example embodiments.
Figure 6B:
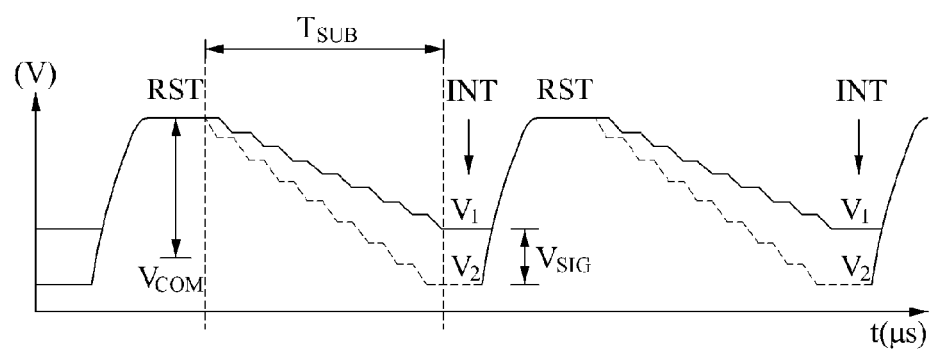

FIGS. 6A and 6B illustrate a timing diagram for describing the operation of a sub pixel and a background light suppression apparatus, according to example embodiments.

In relation to the sub pixels of FIG. 5, FIG. 6A illustrates gate signals TX1 and TX2 610 applied to the sub pixel and a current 620 generated by light input to the sub pixel.

The gate signals TX1 and TX2 610 may have a phase pair of approximately 0 degrees and approximately 180 degrees or of approximately 90 degrees and approximately 270 degrees. A phase difference between the gate signals TX1 and TX2 610 may be approximately 180 degrees. Because the light transferred to the sub pixel may include not only a reflective light reflected from an object but also a background light, the current 620 may include a current by the reflective light and a current 630 by the background light. A hatched area in the current 620 of FIG. 6 refers to a current demodulated by the gate signal TX1. A remaining area without hatch refers to a current demodulated by the gate signal TX2.

FIG. 6B illustrates an example timing diagram describing the operation of the background light suppression apparatus integrating the differences of the output signals output from the sub pixel. In FIG. 6B, it is presumed that the output signals of the sub pixel are denoted by output voltages.

First, the background light suppression apparatus may apply a reset signal RST to the sub pixel and set output voltages V1 and V2 of the sub pixel to predetermined voltages. Next, the background light suppression apparatus may measure the output voltages V1 and V2 of the sub pixel for a sub integration time $T_{SUB}$ which is relatively shorter than a frame integration time. Because the sub pixel converts the transferred light into charge, voltages of FD nodes may be decreased during integration of the charge.

The background light suppression apparatus may control the sub integration time $T_{SUB}$ by determining whether the sub pixel is saturated during the sub integration time $T_{SUB}$. For example, the background light suppression apparatus may determine that the sub pixel is saturated when any one of the output voltages V1 and V2 reaches zero and accordingly reduce the sub integration time $T_{SUB}$. Also, based on the reduced sub integration time $T_{SUB}$, the background light suppression apparatus may measure the output voltages V1 and V2.

When a control signal INT is applied, the background light suppression apparatus may integrate a difference $V_{SIG}$ between the output voltages V1 and V2. Next, the background light suppression apparatus may set the output voltages V1 and V2 to predetermined voltages by the reset signal RST. The background light suppression apparatus may continue integration of the difference $V_{SIG}$ between the voltages V1 and V2 by the control signal INT. The background light suppression apparatus may remove a common mode voltage $V_{COM}$ using the difference $V_{SIG}$.

Figure 7:
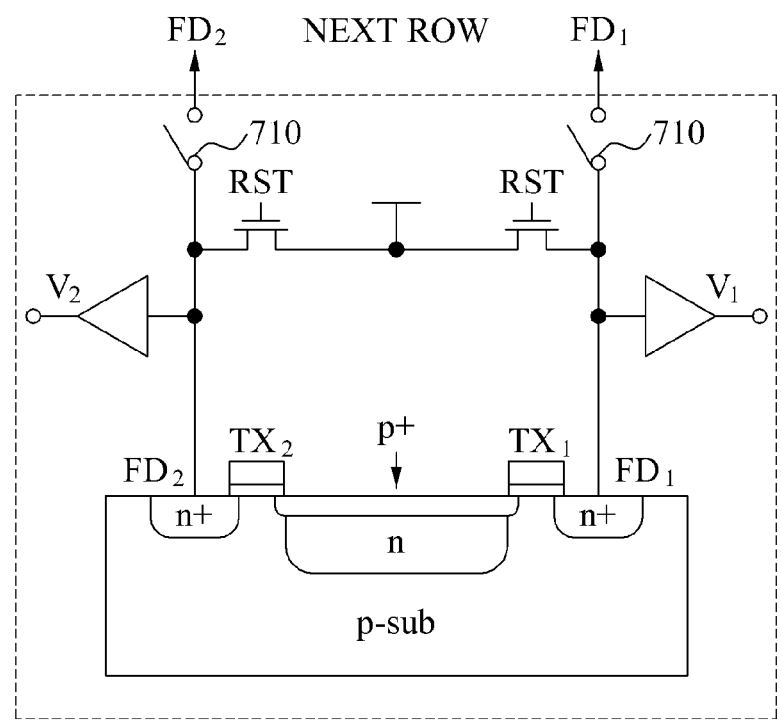
FIG. 7 illustrates a detailed configuration of a sub pixel according to example embodiments.

FIG. 7 illustrates a detailed configuration of a sub pixel according to example embodiments.

In FIG. 7, the configuration of the sub pixel having two additional switches 710 is illustrated. The sub pixel may include demodulation devices adapted to convert light into an output signal. The demodulation devices may be implemented in another way. For example, a CCD or photogate may be used instead of a photodiode. Also, a feedback amplifier may be used in relation to integration of currents.

The sub pixel may be connected to sub pixels located in a next row, by the switches 710. Thus, connected sub pixels may share FD nodes and output a same amplitude of output signals from the respective FD nodes. Therefore, the sub pixels may increase an effective well capacity and improve the BSR and the SNR.

FIG. 8 illustrates an example of generating a super pixel according to example embodiments.

Row direction pixel binning may be performed in a pixel level. For example, a background light suppression apparatus may connect a sub pixel 810 with another sub pixel 810 located in a next row using switches.

Column direction pixel binning may be performed in a column level. For example, the background light suppression apparatus may obtain an average value of the output signals of the sub pixels 810 using switches 850 between sampling capacitors 860 present in the column level. The background light suppression apparatus may reduce a number of transistors to be included in the sub pixels 810 through processing in the column level. That is, the sub pixels 810 may be implemented by a chip with a reduced area.

Figure 8A:
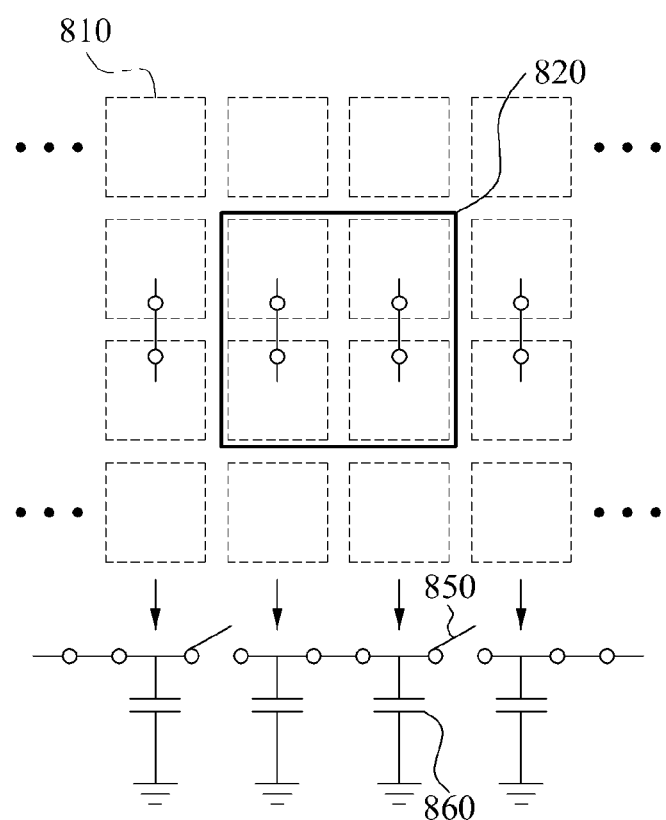
FIGS. 8A and 8B illustrate an example of generating a super pixel according to example embodiments.
Figure 8B:
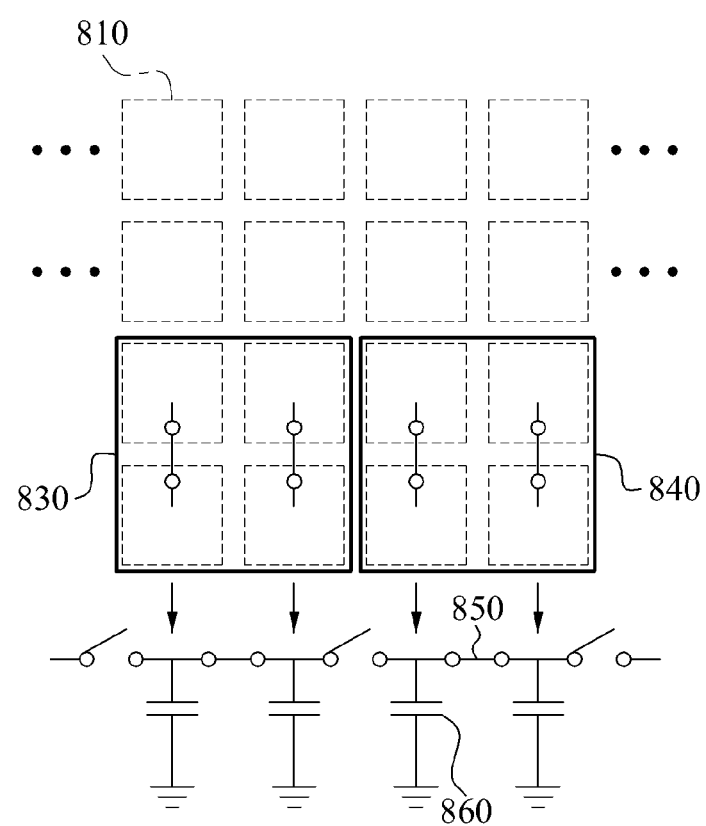

FIG. 8A shows one super pixel 820 generated by pixel binning. FIG. 8B shows two super pixels 830 and 840 newly generated by shifting the super pixel 820 of FIG. 8A in two different directions.

The background light suppression apparatus may shift the super pixel 820 using the sub pixels 810 adjacent to the super pixel 820. In detail, the background light suppression apparatus may shift the super pixel 820, by controlling the switches of the sub pixels 810 and the switches 850 located between the sampling capacitors 860 in the column level.

FIG. 9 illustrates operation of shifting a super pixel according to example embodiments.

In FIG. 9, sixteen super pixels in a 2×2 size are shown. One super pixel includes four sub pixels. The sixteen super pixels form one cluster. The background light suppression apparatus may shift the super pixels by changing combination of the sub pixels. The super pixels may be shifted in any direction through a change of combination of the sub pixels.

According to FIG. 9, the super pixels are shifted in eight different directions from an original position. A minimum shift distance of the super pixels is a pitch of one sub pixel. The background light suppression apparatus may perform capturing several times to generate one depth image frame. For example, the background light suppression apparatus may integrate differences of output signals of the super pixels at respective shifted positions of the super pixels. Through the aforementioned process, the spatial resolution of the frame and the SNR may be increased.

Figure 10:
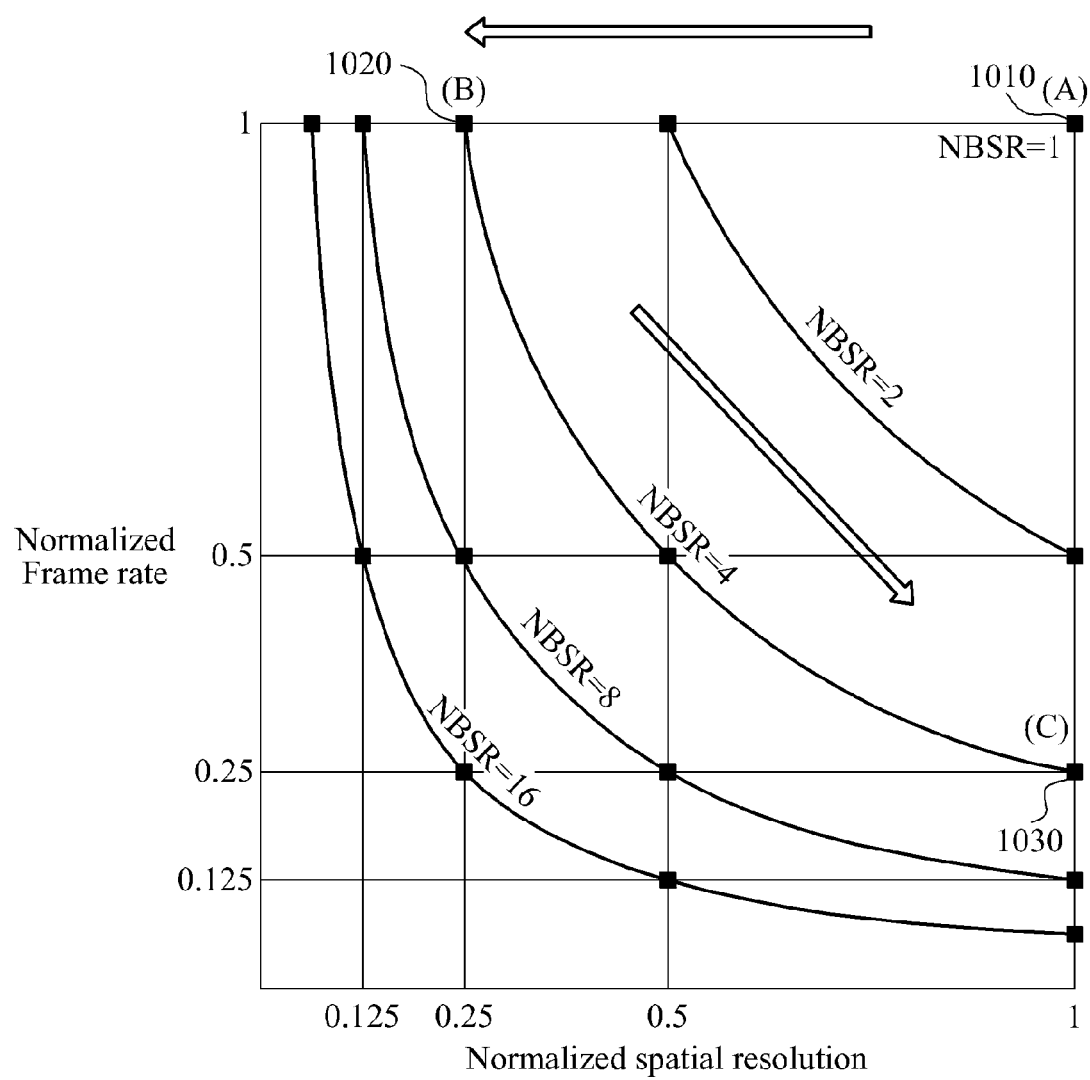
FIG. 10 illustrates operation points related to an operation of a background light suppression apparatus according to example embodiments.

FIG. 10 illustrates operation points related to operation of a background light suppression apparatus according to example embodiments.

The background light suppression apparatus may provide a reconfigurable architecture based on parameters such as a BSR, an SNR, a frame rate of a depth image, and spatial resolution of the depth image. The parameters may be traded off with each other.

For example, when the background light suppression apparatus performs pixel binning in the row direction, the BSR and the spatial resolution may be traded off. When the background light suppression apparatus shifts a super pixel and performs capturing several times, the spatial resolution and the frame rate may be traded off. The SNR may be traded off with all the other performances.

FIG. 10 illustrates the operation points of the reconfigurable architecture provided by the background light suppression apparatus. In FIG. 10, magnitudes of the spatial resolution and the frame rate may refer to values normalized based on a maximum value that the super pixel may reach.

The operation points shown in FIG. 10 may be determined by Equation 1.

$$NBSR = 1/(\text{frame rate} \times \text{spatial resolution}) = \text{normalized well capacity} \quad \text{[Equation 1]}$$

According to Equation 1, when normalized BSR (NBSR) increases, the well capacity is increased and therefore the SNR is increased. Presuming that the background light is constant, the SNR may be increased according to the increase in the NBSR. When the background light is increased N times, the noise power is also increased N times. However, when the NBSR is increased N times for removal of the background light, the SNR may be compensated and maintained at a constant value.

An operation point A 1010 denotes a reference point which indicates that the background light suppression apparatus has not performed any operation. The operation point A 1010 may have a minimum NBSR, a maximum spatial resolution, and a maximum frame rate.

When the background light at the operation point A 1010 is increased to four times and accordingly the NBSR is increased to four times to compensate for the increased background light, the operation of the background light suppression apparatus may be explained based on an operation point B 1020. The background light suppression apparatus may increase the NBSR by generating a super pixel through row direction pixel binning. Although the background light is increased, the background light suppression apparatus may maintain the SNR by increasing the NBSR through the row direction pixel binning.

The spatial resolution may be decreased according to the increase in the NBSR. For example, when the background light suppression apparatus generates one super pixel by performing pixel binning with respect to four sub pixels located in the row direction, the NBSR may be increased to approximately four times as much while the spatial resolution is reduced to approximately ¼.

The background light suppression apparatus may shift the super pixel and perform capturing several times to increase the reduced spatial resolution. This may be explained through relations between the operation point B 1020 and an operation point C 1030.

When the background light is strong, a photon-shot noise may be dominant. The photon-shot noise may be proportional to a square root of a photocurrent. That is, when the NBSR is doubled, the photon-shot noise may become $\sqrt{2}$ times while the photon-shot noise is doubled. The photocurrent may refer to a current generated through conversion from the incident light into charge.

To compensate for the increased the photon-shot noise, intensity of the output signal needs to be proportionally increased. The background light suppression apparatus may increase the intensity of the output signal by performing pixel binning or by shifting the super pixel and performing capturing several times. As a result, the photo current related to the output signal may be doubled and power may be quadrupled. However, a noise current by the photon-shot noise may be increased by only $\sqrt{2}$ times as much while the power is doubled. The background light suppression apparatus may perform pixel binning in the column direction to further increase quality of the output signal, for example, the SNR.

Figure 11A:
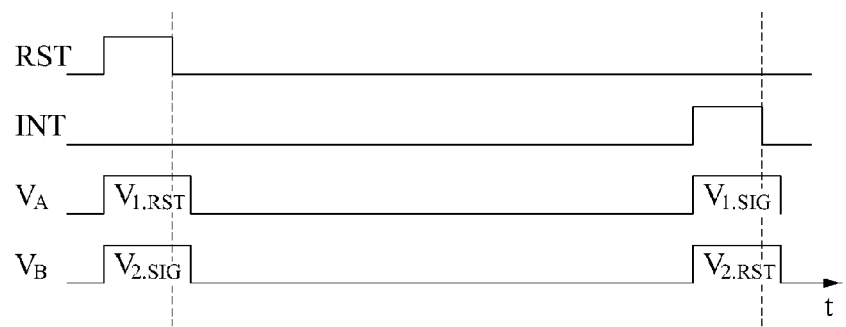
FIGS. 11A and 11B illustrate an operation of a background light suppression apparatus according to example embodiments.
Figure 11B:
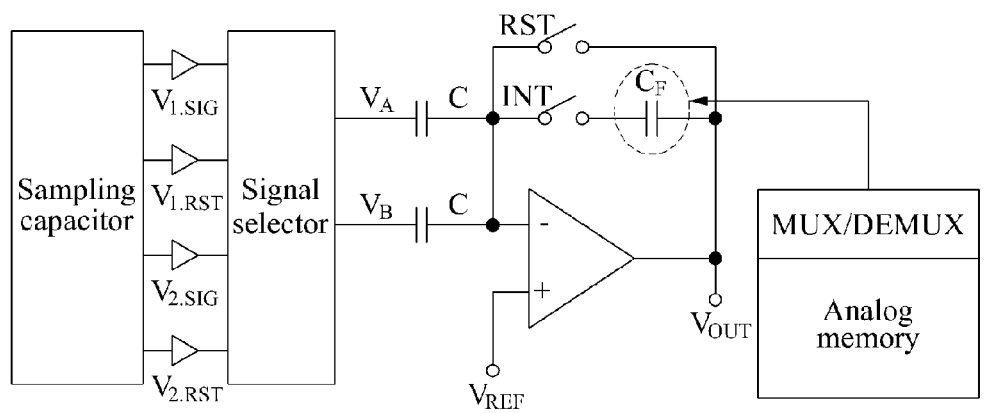

FIGS. 11A and 11B illustrate operation of a background light suppression apparatus according to example embodiments.

FIG. 11A is a timing diagram illustrating control signals RST and INT and input signals $V_{1,RST}$, $V_{1,SIG}$, $V_{2,RST}$, and $V_{2,SIG}$ selected by a signal selector. The input signals $V_{1,RST}$ and $V_{2,RST}$ refer to reset signals applied to a first FD node and a second FD node. The input signals $V_{1,SIG}$ and $V_{2,SIG}$ refer to output signals output from the first FD node and the second FD node. FIG. 11B illustrates the background light suppression apparatus located in a column level and configured in the form of a difference integrator.

The difference integrator may select two input signals simultaneously using the signal selector, among input signals transmitted from a sampling capacitor. The selected two input signals may be used as input signals of the difference integrator.

Operation of the difference integrator may include two sampling steps. First, while an RST switch is closed by the control signal RST and an INT switch is opened, the difference integrator may sample two input signals $V_{1,RST}$ and $V_{2,SIG}$ as well as an input offset of an operational amplifier (OP AMP). Next, the difference integrator may sample two input signals $V_{1,SIG}$ and $V_{2,RST}$ while the INT switch is closed by the control signal INT and the RST switch is opened.

When the two sampling steps are performed, differences between output signals integrated in a feedback capacitor $C_F$ may be expressed by Equation 2.

$$\Delta V_{OUT} = (V_{1,RST} - V_{1,SIG}) - (V_{2,RST} - V_{2,SIG}) \quad \text{[Equation 2]}$$

When integrating the differences between the output signals, the difference integrator may remove the reset noise using the reset signal applied to a sub pixel.

The feedback capacitor $C_F$ may be selected from an analog memory. A gain of the difference integrator may be determined based on a ratio between an input capacitor C and the feedback capacitor $C_F$. Therefore, the difference integrator may operate as a programmable gain amplifier (PGA) by selecting a proper input capacitor C.

Figure 12A:
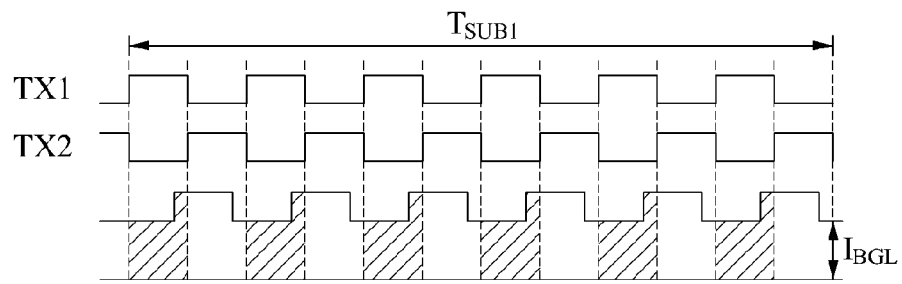
FIGS. 12A to 12C illustrate an operation of removing a gain mismatch by a background light suppression apparatus according to example embodiments.
Figure 12B:
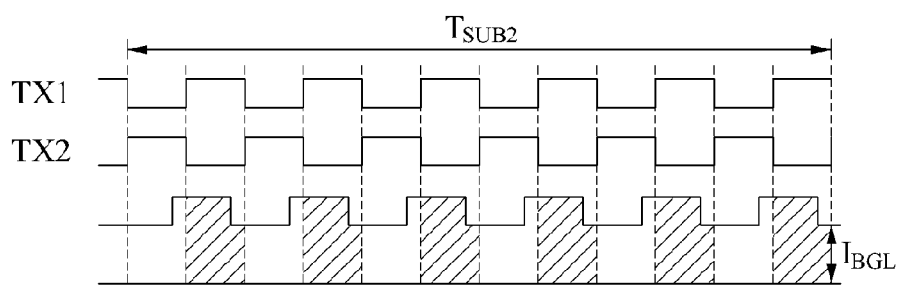
Figure 12C:
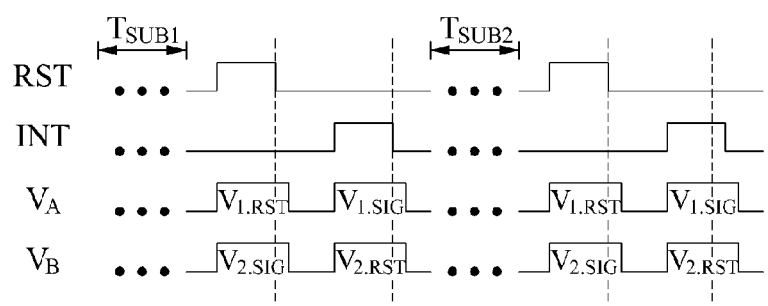

FIGS. 12A to 12C illustrate operation of removing a gain mismatch by a background light suppression apparatus according to example embodiments.

The background light suppression apparatus may integrate differences between output signals of sub pixels constituting a depth sensor, and measure the output signals of the sub pixels based on gate signals of which phases are switched.

For example, as shown in FIG. 12A, the background light suppression apparatus may apply gate signals TX1 and TX2 having a phase pair of approximately 0 degrees and approximately 180 degrees to the sub pixels for a first sub integration time $T_{SUB1}$, and integrate the differences between the output signals of the sub pixels. Next, as shown in FIG. 12B, the background light suppression apparatus may apply the gate signals TX1 and TX2 having a phase pair of approximately 180 degrees and approximately 0 degrees, for a second sub integration time $T_{SUB2}$ to the sub pixels, and integrate the differences between the output signals of the sub pixels.

As described above, the background light suppression apparatus may alternately switch paths of signals applied to the sub pixels. Accordingly, the gain mismatch generated between the signal paths may be removed. FIG. 12C is a timing diagram illustrating the aforementioned process overall. A process of integrating the differences between the output signals may be understood by referencing the description related to FIG. 11. In detail, the background light suppression apparatus may sample the input signals and integrate the differences based on the reset signals applied to the sub pixels.

Figure 13A:
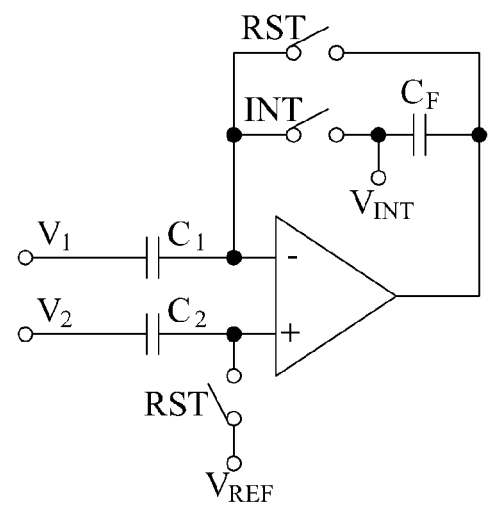
FIGS. 13A and 13B illustrate an operation of a background light suppression apparatus according to example embodiments.
Figure 13B:
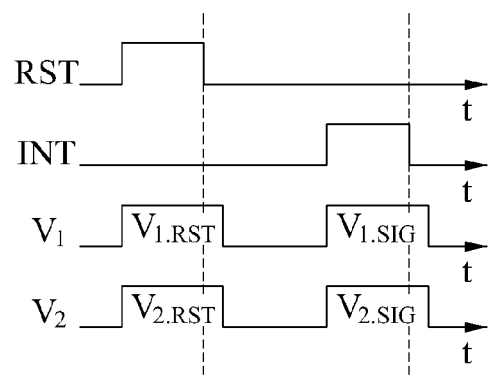

FIGS. 13A and 13B illustrate operation of a background light suppression apparatus according to example embodiments.

In FIGS. 13A and 13B, a difference integrator is illustrated as an example of the background light suppression apparatus being in a pixel level. A background light suppression method may be performed in the pixel level for a maximum BSR. The background light suppression apparatus in the pixel level may perform the background light suppression method without sampling capacitors. In FIG. 13A, an input capacitor $C_1$ and a feedback capacitor $C_F$ may operate as a switched capacitor integrator. An input capacitor $C_2$ and an RST switch connected to the input capacitor $C_2$ may be used to provide improved gain matching. FIG. 13B is a timing diagram related to control signals RST and INT and input signals $V_{1,RST}$, $V_{1,SIG}$, $V_{2,RST}$, and $V_{2,SIG}$.

Presuming that capacities of the input capacitor $C_1$ and the input capacitor $C_2$ are equal, the difference integrator may generate an integrated voltage $V_{INT}$ as shown in Equation 3.

$$\Delta V_{INT} = (V_{2,RST} - V_{2,SIG}) - (V_{1,RST} - V_{1,SIG}) \quad \text{[Equation 3]}$$

Figure 14:
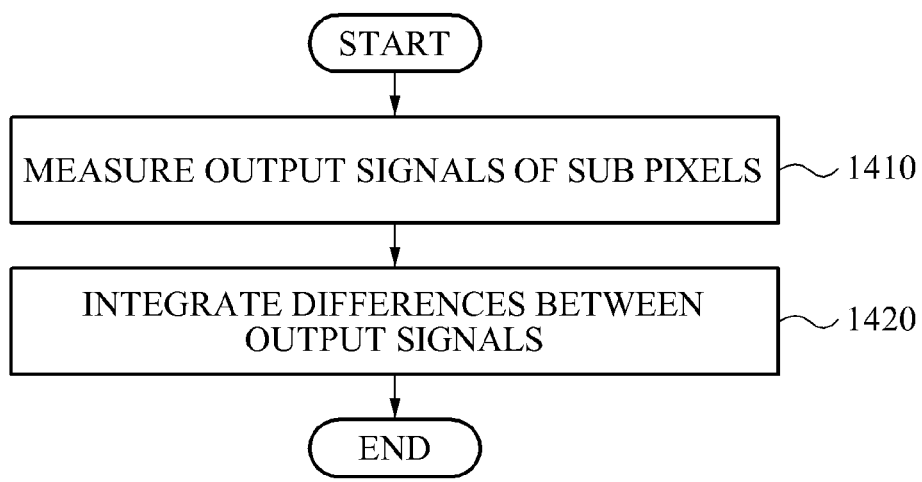
FIG. 14 illustrates a flowchart describing detailed steps of a background light suppression method according to example embodiments.

FIG. 14 illustrates a flowchart describing detailed steps of a background light suppression method according to example embodiments.

In operation 1410, a background light suppression apparatus may measure output signals of sub pixels for a sub integration time which is shorter than a frame integration time. The background light suppression apparatus may measure the output signals of the sub pixels for several times of the sub integration time.

The sub integration time may be controlled based on a saturation degree of the sub pixels with respect to optical sensing or intensity of the output signals. For example, the background light suppression apparatus may determine the sub pixels to be saturated when the intensity of the output signals of the sub pixels reaches a predetermined threshold or when the intensity of the output signals does not significantly change for a predetermined time. When the sub pixels are saturated, the background light suppression apparatus may reduce the sub integration time, thereby reducing the intensity being input to the sub pixels during the sub integration time. In addition, when the intensity being input during the sub integration time is determined to be insufficient, the background light suppression apparatus may increase the sub integration time.

The background light suppression apparatus may measure the output signals of the sub pixels based on gate signals having different phases. For example, the background light suppression apparatus may apply gate signals having a phase pair of approximately 0 degrees and approximately 180 degrees or of approximately 90 degrees and approximately 270 degrees to the sub pixels, thereby measuring the output signals.

After integrating differences between the output signals of the sub pixels constituting a depth sensor, the background light suppression apparatus may measure the output signals of the sub pixels based on the gate signals of which phases are switched. The background light suppression apparatus may alternately switch paths of signals applied to the sub pixels, thereby removing the gain mismatch generated between the signal paths.

In operation 1420, after the sub integration time, the background light suppression apparatus may integrate differences between the output signals output from the sub pixels. For example, the background light suppression apparatus may calculate and integrate voltage differences between a first FD node and a second FD node after the sub integration time.

The background light suppression apparatus may integrate the differences between the output signals based on a reset signal applied to the FD nodes of the sub pixels. For example, the background light suppression apparatus may use a difference between the output signals output from the respective FD nodes and the reset signal applied to the FD nodes. The background light suppression apparatus may remove a reset noise by performing CDS.

The background light suppression apparatus may continue integration of the differences between the output signals until the integrated value reaches a predetermined value, which is a reference for generation of a depth image frame. For example, the background light suppression apparatus may integrate the differences between the output signals until the integrated value reaches a predetermined value.

Figure 15:
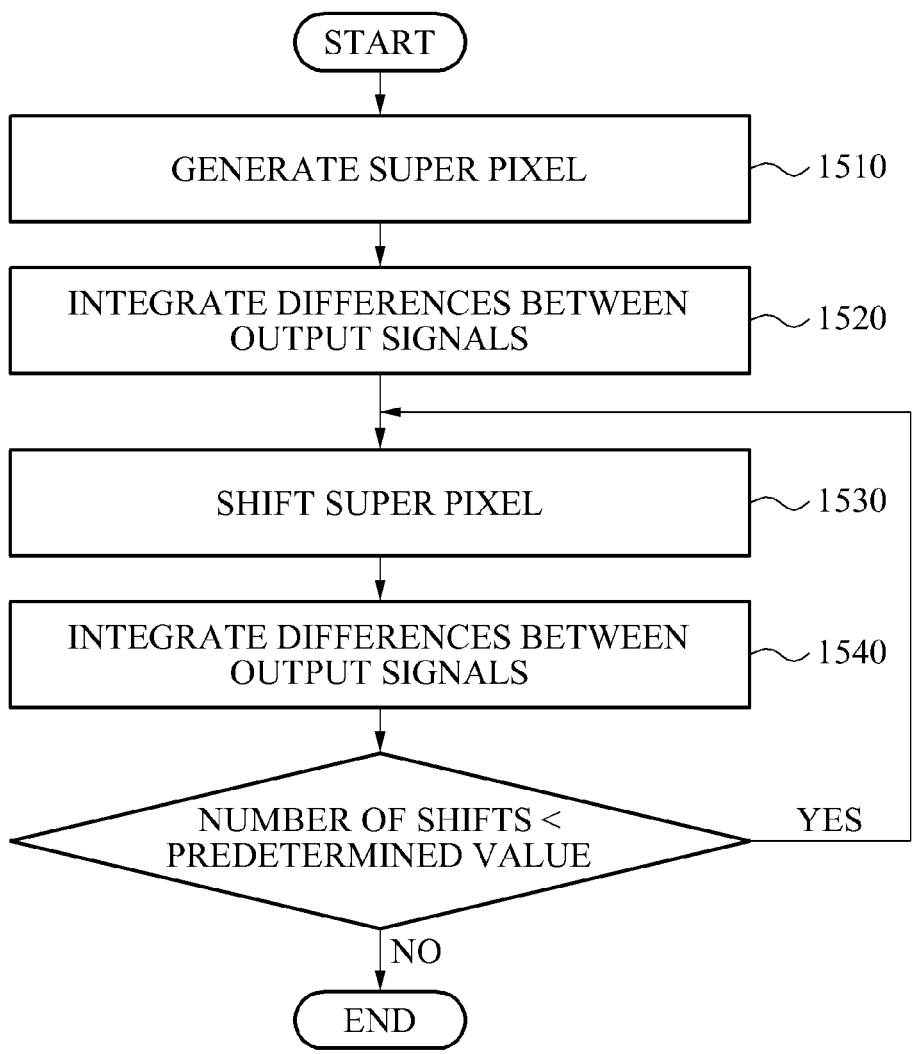
FIG. 15 illustrates a flowchart describing detailed steps of a background light suppression method according to example embodiments.

FIG. 15 illustrates a flowchart describing detailed steps of a background light suppression method according to example embodiments.

In operation 1510, a background light suppression apparatus may generate a super pixel by performing pixel binning with respect to a plurality of sub pixels. For example, the background light suppression apparatus may set a block to adjacent sub pixels, sum outputs of a first FD node of the sub pixels defined in the block, and sum outputs of a second FD node, thereby generating one super pixel.

The background light suppression apparatus may perform pixel binning in a row direction based on intensity of output signals output from the sub pixels. By performing the row direction pixel binning, the background light suppression apparatus may increase the BSR and the SNR.

The background light suppression apparatus may perform pixel binning in a column direction based on complexity related to processing of the output signals output from the sub pixels. When the complexity is determined to be high, the background light suppression apparatus may reduce the complexity by performing the column direction pixel binning. The column direction pixel binning may increase the SNR while reducing the complexity related to processing of the output signals.

In operation 1520, the background light suppression apparatus may integrate differences between the output signals output from the super pixel, based on a sub integration time which is relatively shorter than a frame integration time. For example, the background light suppression apparatus may integrate the differences by calculating voltage differences between a first FD node and a second FD node of the super pixel after the sub integration time. The sub integration time may be controlled based on a saturation degree of the sub pixels with respect to optical sensing or intensity of the output signals.

In addition, the background light suppression apparatus may integrate the differences between the output signals output from the super pixel based on a reset signal applied to the FD nodes. For example, the background light suppression apparatus may use a difference between the output signals output from the respective FD nodes and the reset signal applied to the FD nodes.

In operation 1530, the background light suppression apparatus may shift the super pixel based on spatial resolution related to one depth image frame. For example, when the spatial resolution is determined to be low, the background light suppression apparatus may shift the super pixel to increase the spatial resolution. For example, the background light suppression apparatus may change combination of the sub pixels constituting the super pixel using sub pixels adjacent to an existing super pixel, which may be indicated as shift of the super pixel.

In operation 1540, the background light suppression apparatus may integrate the differences between the output signals of the shifted super pixels. The operation may be understood by referencing operation 1520. The background light suppression apparatus may calculate a pixel signal of every sub pixel, using the differences between the output signals of the shifted super pixels. Also, the spatial resolution decreased by generation of the super pixels may be compensated.

The background light suppression apparatus may repeat operations 1530 and 1540. For example, the background light suppression apparatus may repetitively shift the super pixel until a number of shifts reaches a predetermined value, by comparing the number of shifts with the predetermined value, and integrate the differences between the output signals of the super pixels at respective shifted positions. Accordingly, the background light suppression apparatus may increase the spatial resolution and the SNR.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A background light suppression method comprising:
measuring output signals of a sub pixel in a depth sensor for a sub integration time shorter than a frame integration time;
calculating by a processor,
differences between the measured output signals after the sub integration time so that an error in depth value caused by background light is removed;
integrating, by the processor, the differences between the measured output signals when a control signal is applied; and
setting the output signals of the sub pixel to predetermined values.

2. The background light suppression method of claim 1, wherein the sub integration time is controlled based on at least one of a saturation degree of the sub pixel with respect to optical sensing and an intensity of the measured output signals.

3. The background light suppression method of claim 1, wherein the measuring of the output signals of the sub pixels is based on gate signals having different phases.

4. The background light suppression method of claim 3, wherein the measuring comprises integrating the differences between the output signals of sub pixels constituting the depth sensor and measuring the output signals of the sub pixels based on the gate signals of which phases are switched.

5. The background light suppression method of claim 1, wherein the integrating comprises integrating the differences between the measured output signals, based on a reset signal applied to a floating diffusion node of the sub pixel.

6. The background light suppression method of claim 1, wherein the sub pixel comprises a first floating diffusion node and a second floating diffusion node, and
the measuring comprises measuring voltages of the first floating diffusion node and the second floating diffusion node using gate signals having phase differences of 0 degrees and 180 degrees, respectively, with respect to light emitted from a light source and reflected to the sub pixel.

7. The background light suppression method of claim 6, wherein integrating the differences comprises integrating a voltage difference between the measured voltage of the first floating diffusion node and the measured voltage of the second floating diffusion node.

8. A background light suppression method comprising:
generating a super pixel by performing pixel binning with respect to a plurality of sub pixels;
calculating, by a processor, differences between output signals from the super pixel based on a sub integration time shorter than a frame integration time so that an error in depth value caused by background light is removed;
integrating, by the processor, the differences between the measured output signals when a control signal is applied; and
setting the output signals of the super pixel to predetermined values.

9. The background light suppression method of claim 8, wherein the generating comprises performing pixel binning in row a direction based on an intensity of output signals from the sub pixels.

10. The background light suppression method of claim 8, wherein the generating comprises performing pixel binning in a column direction based on complexity related to processing of output signals from the sub pixels.

11. The background light suppression method of claim 8, further comprising:
shifting the super pixel by altering a combination of the sub pixels constituting the super pixel; and
integrating differences between output signals from the shifted super pixel.

12. The background light suppression method of claim 11, wherein the shifting comprises shifting the super pixel based on spatial resolution with respect to one depth image frame.

13. The background light suppression method of claim 8, wherein the sub integration time is controlled based on at least one of a saturation degree of the super pixel with respect to optical sensing and an intensity of the output signals.

14. A background light suppression apparatus comprising:
at least one processor to perform:
generation of a super pixel by performing pixel binning with respect to a plurality of sub pixels;
calculation of differences between output signals from the super pixel based on a sub integration time shorter than a frame integration time so that an error in depth value caused by background light is removed;
integration of the differences between the output signals when a control signal is applied; and
setting of the output signals of the super pixel to predetermined values.

15. The background light suppression apparatus of claim 14, wherein the processor performs pixel binning in a row direction based on an intensity of output signals from the sub pixels.

16. The background light suppression apparatus of claim 14, wherein the processor performs pixel binning in a column direction based on complexity related to processing of output signals from the sub pixels.

17. The background light suppression apparatus of claim 14, wherein
the processor shifts the super pixel by altering combination of the sub pixels constituting the super pixel; and
the processor integrates differences between output signals from the shifted super pixel.

18. The background light suppression apparatus of claim 17, wherein the super pixel is shifted based on spatial resolution with respect to one depth image frame.

19. The background light suppression apparatus of claim 14, wherein the sub integration time is controlled based on at least one of a saturation degree of the super pixel with respect to optical sensing and an intensity of the output signals.

20. A background light suppression apparatus comprising:
at least one processor to perform:
measurement of output signals of sub pixels in a depth sensor for a sub integration time shorter than a frame integration time;
calculation of differences between the measured output signals after the sub integration time so that an error in depth value caused by background light is removed; and
integration of the differences between the measured output signals when a control signal is applied; and
setting of the output signals of the sub pixels to predetermined values.

21. The background light suppression apparatus of claim 20, wherein
the sub integration time is controlled based on at least one of a saturation degree of the sub pixels with respect to optical sensing and an intensity of the output signals;
the processor performs measurement of the output signals of the sub pixels based on gate signals having different phases;
the processor performs integration of the differences between the output signals of the sub pixels constituting a depth sensor and measures the output signals of the sub pixels based on the gate signals of which phases are switched; and
the processor integrates the differences between the output signals, based on a reset signal applied to a floating diffusion node of each of the sub pixels.

* * * * *